US008721422B2

(12) United States Patent
Casey et al.

(10) Patent No.: US 8,721,422 B2
(45) Date of Patent: May 13, 2014

(54) WAGERING GAME WITH AWARD ENHANCEMENT FEATURE

(75) Inventors: Michael P. Casey, Chicago, IL (US); Bradely A. Rose, Chicago, IL (US); Jason C. Gilmore, Scottsdale, AZ (US)

(73) Assignee: WMS Gaming Inc., Waukegan, IL (US)

( * ) Notice: Subject to any disclaimer, the term of this patent is extended or adjusted under 35 U.S.C. 154(b) by 1949 days.

(21) Appl. No.: 11/133,043

(22) Filed: May 19, 2005

(65) Prior Publication Data

US 2005/0261055 A1 Nov. 24, 2005

Related U.S. Application Data

(60) Provisional application No. 60/572,435, filed on May 19, 2004.

(51) Int. Cl.
*A63F 13/00* (2006.01)

(52) U.S. Cl.
USPC .......................................................... 463/20

(58) Field of Classification Search
USPC ..................................................... 463/16-20
See application file for complete search history.

(56) References Cited

U.S. PATENT DOCUMENTS

| | | | | |
|---|---|---|---|---|
| 3,281,149 | A | 10/1966 | Miller | 273/143 |
| 4,095,795 | A | 6/1978 | Saxton et al. | 273/143 R |
| 4,306,768 | A | 12/1981 | Egging | 350/174 |
| 4,335,809 | A | 6/1982 | Wain | 194/1 R |
| 4,448,419 | A | 5/1984 | Telnaes | 273/143 R |
| 4,508,345 | A | 4/1985 | Okada | 273/143 R |
| 4,624,459 | A | 11/1986 | Kaufman | 273/143 R |
| 4,721,307 | A | 1/1988 | Okada | 273/143 R |
| 4,763,256 | A | 8/1988 | DeMar | 364/410 |
| 4,772,023 | A | 9/1988 | Okada | 273/143 R |
| 4,805,907 | A | 2/1989 | Hagiwara | 273/138 A |
| 4,871,171 | A | 10/1989 | Rivero | 273/138 A |
| 5,083,785 | A | 1/1992 | Okada | 273/143 R |
| 5,169,147 | A | 12/1992 | Hamano | 273/138 A |
| 5,205,555 | A | 4/1993 | Hamano | 273/143 R |
| 5,259,616 | A | 11/1993 | Bergmann | 273/138 A |
| 5,292,127 | A | 3/1994 | Kelly et al. | 273/138 R |
| 5,342,047 | A | 8/1994 | Heidel et al. | 273/85 CP |

(Continued)

FOREIGN PATENT DOCUMENTS

| | | | |
|---|---|---|---|
| DE | 37 00 861 | 7/1988 | G07F 17/32 |
| DE | 40 14 477 | 7/1991 | G07C 15/00 |

(Continued)

OTHER PUBLICATIONS

Product Sheet for "Monopoly SWP," JPM Ltd., 4 pages (date unknown).

(Continued)

*Primary Examiner* — David L Lewis
*Assistant Examiner* — Eric M Thomas
(74) *Attorney, Agent, or Firm* — Nixon Peabody LLP

(57) ABSTRACT

A gaming machine includes a value input device, one or more displays, and a controller. The value input device receives a wager from a player to play the wagering game. The one or more displays display a trail including a plurality of spaces and an award value associated with one or more of the plurality of spaces. The controller is operative to change the award value based on an occurrence of a random event independent from the trail.

17 Claims, 12 Drawing Sheets

(56) References Cited

U.S. PATENT DOCUMENTS

| | | | | |
|---|---|---|---|---|
| 5,342,049 | A | 8/1994 | Wichinsky et al. | 271/119 R |
| 5,380,008 | A | 1/1995 | Mathis et al. | 273/143 R |
| 5,393,057 | A | 2/1995 | Marnell, II | 273/85 CP |
| 5,401,024 | A | 3/1995 | Simunek | 273/138 A |
| 5,415,404 | A | 5/1995 | Joshi et al. | 273/138 A |
| 5,429,361 | A | 7/1995 | Raven et al. | 273/138 A |
| 5,431,408 | A | 7/1995 | Adams | 273/306 |
| 5,449,173 | A | 9/1995 | Thomas et al. | 273/143 R |
| 5,456,465 | A | 10/1995 | Durham | 273/138 A |
| 5,456,466 | A | 10/1995 | Miles | 273/143 R |
| 5,542,669 | A | 8/1996 | Charron et al. | 463/13 |
| 5,547,192 | A | 8/1996 | Ishibashi | 463/26 |
| 5,624,119 | A | 4/1997 | Leake | 273/269 |
| 5,647,798 | A | 7/1997 | Falciglia | 463/19 |
| 5,664,781 | A | 9/1997 | Feola | 273/292 |
| 5,697,843 | A | 12/1997 | Manship et al. | 463/20 |
| 5,704,835 | A | 1/1998 | Dietz, II | 463/20 |
| 5,722,891 | A | 3/1998 | Inoue | 463/20 |
| 5,779,545 | A | 7/1998 | Berg et al. | 463/22 |
| 5,788,573 | A | 8/1998 | Baerlocher et al. | 463/16 |
| 5,823,874 | A | 10/1998 | Adams | 463/17 |
| 5,848,932 | A | 12/1998 | Adams | 463/20 |
| 5,951,397 | A | 9/1999 | Dickinson | 463/36 |
| 6,059,289 | A * | 5/2000 | Vancura | 273/143 R |
| 6,089,871 | A | 7/2000 | Jaffe | 434/209 |
| 6,155,925 | A * | 12/2000 | Giobbi et al. | 463/20 |
| 6,186,894 | B1 * | 2/2001 | Mayeroff | 463/20 |
| 6,190,255 | B1 * | 2/2001 | Thomas et al. | 463/20 |
| 6,203,429 | B1 * | 3/2001 | Demar et al. | 463/20 |
| 6,234,897 | B1 | 5/2001 | Frohm et al. | |
| 6,315,660 | B1 * | 11/2001 | DeMar et al. | 463/16 |
| 6,364,314 | B1 * | 4/2002 | Canterbury | 273/274 |
| 6,428,412 | B1 | 8/2002 | Anderson et al. | 463/9 |
| 6,482,089 | B2 | 11/2002 | DeMar et al. | 463/20 |
| 6,506,117 | B2 | 1/2003 | DeMar et al. | 463/20 |
| 6,520,855 | B2 * | 2/2003 | DeMar et al. | 463/20 |
| 6,607,437 | B2 | 8/2003 | Casey et al. | 463/16 |
| 6,685,560 | B1 | 2/2004 | Hughes | 463/16 |
| 7,137,884 | B2 | 11/2006 | Gilmore | 463/16 |
| 7,137,886 | B2 | 11/2006 | Locke et al. | 463/20 |
| 7,195,560 | B2 | 3/2007 | DeMar et al. | |
| 2002/0132659 | A1 * | 9/2002 | DeMar et al. | 463/16 |
| 2002/0137560 | A1 * | 9/2002 | DeMar et al. | 463/16 |
| 2002/0137561 | A1 | 9/2002 | DeMar et al. | 463/16 |
| 2002/0142823 | A1 | 10/2002 | DeMar et al. | 463/16 |
| 2003/0022711 | A1 | 1/2003 | Locke et al. | 463/16 |
| 2003/0157978 | A1 | 8/2003 | Englman | |
| 2003/0181238 | A1 | 9/2003 | DeMar et al. | |
| 2003/0199307 | A1 | 10/2003 | DeMar et al. | |
| 2005/0003886 | A1 | 1/2005 | Englman et al. | 463/25 |
| 2005/0026679 | A1 * | 2/2005 | Lucchesi et al. | 463/20 |
| 2005/0049029 | A1 | 3/2005 | Gazdic et al. | 463/20 |
| 2005/0288093 | A1 | 12/2005 | Englman et al. | 463/20 |
| 2006/0009283 | A1 | 1/2006 | Englman et al. | 463/20 |
| 2006/0111169 | A1 | 5/2006 | Hornik et al. | 463/16 |
| 2006/0116194 | A1 | 6/2006 | Pacey et al. | 463/20 |
| 2006/0135243 | A1 | 6/2006 | Englman et al. | 463/16 |
| 2006/0287043 | A1 | 12/2006 | Englman et al. | 463/16 |
| 2007/0021183 | A1 | 1/2007 | Fiden et al. | 463/17 |

FOREIGN PATENT DOCUMENTS

| | | | |
|---|---|---|---|
| EP | 0 142 371 | 5/1985 | G07F 17/34 |
| EP | 0 148 001 | 7/1985 | G07F 17/34 |
| EP | 0 333 338 | 9/1989 | G07F 17/32 |
| EP | 0 577 415 | 1/1994 | A63F 9/04 |
| FR | 1 474 617 | 3/1967 | |
| GB | 1 129 607 | 10/1968 | A63F 9/00 |
| GB | 1 476 848 | 6/1977 | G07F 17/34 |
| GB | 1 591 623 | 6/1981 | G07F 17/34 |
| GB | 2 066 991 | 7/1981 | G07F 17/34 |
| GB | 2 072 395 | 9/1981 | G07F 17/34 |
| GB | 2 083 936 | 3/1982 | G07F 17/34 |
| GB | 2 084 371 | 4/1982 | G07F 17/34 |
| GB | 2 096 376 | 10/1982 | G07F 17/34 |
| GB | 2 097 160 | 10/1982 | G07F 17/34 |
| GB | 2 105 891 | 3/1983 | G07F 17/34 |
| GB | 2 106 685 | 4/1983 | G07F 17/34 |
| GB | 2 117 952 | 10/1983 | G07F 17/34 |
| GB | 2 147 442 | 5/1985 | G07F 17/34 |
| GB | 2 147 773 | 5/1985 | A63F 9/22 |
| GB | 2 152 262 | 7/1985 | G07F 17/34 |
| GB | 2 153 572 | 8/1985 | G07F 17/34 |
| GB | 2 157 047 | 10/1985 | G07F 17/34 |
| GB | 2 165 385 | 4/1986 | G07F 17/34 |
| GB | 2 170 636 | 8/1986 | G07F 17/34 |
| GB | 2 180 087 | 3/1987 | G07F 17/34 |
| GB | 2 181 589 | 4/1987 | G07F 17/34 |
| GB | 2 183 882 | 6/1987 | G07F 17/34 |
| GB | 2 191 030 | 12/1987 | G07F 17/34 |
| GB | 2 197 974 | 6/1988 | G07F 17/34 |
| GB | 2 202 984 | 10/1988 | G07F 17/34 |
| GB | 2 204 436 | 11/1988 | G07F 17/34 |
| GB | 2 210 191 | 6/1989 | G07F 17/34 |
| GB | 2 222 712 | 3/1990 | G07F 17/34 |
| GB | 2 226 907 | 7/1990 | G07F 17/34 |
| GB | 2 229 565 | 9/1990 | A63F 9/00 |
| GB | 2 230 373 | 10/1990 | G07F 17/34 |
| GB | 2 233 806 | 1/1991 | G07F 17/34 |
| GB | 2 242 300 | 9/1991 | G07F 17/34 |
| GB | 2 253 154 | 9/1992 | A63F 9/04 |
| GB | 2 262 642 | 6/1993 | G07F 17/34 |
| GB | 2 270 787 | 3/1994 | G07F 17/34 |
| GB | 2 273 384 | 8/1994 | G07F 17/34 |
| GB | 2 287 567 | 9/1995 | G07F 17/34 |
| GB | 2 297 857 | 8/1996 | G07F 17/34 |
| GB | 2 298 508 | 9/1996 | G07F 17/34 |
| GB | 2353128 A * | 2/2001 | |
| WO | WO 88/08179 | 10/1988 | G07F 17/34 |
| WO | WO 89/12875 | 12/1989 | G07F 17/32 |
| WO | WO 92/10818 | 6/1992 | G07F 17/32 |
| WO | WO 94/01840 | 1/1994 | G07F 17/34 |
| WO | WO 2006/026250 | 3/2006 | A63F 13/00 |

OTHER PUBLICATIONS

Product Sheet for “Big Money,” WMS Gaming Inc., 1 page (date unknown).

Product Sheet for “Piggy Bankin’,” WMS Gaming Inc., 1 page (date unknown).

Product Sheet for “Pirate’s Thunder,” WMS Gaming Inc., 1 page (date unknown).

Bally Circus Advertisement for excerpt from “Lemons, Cherries and Bell Fruit Gum,” Richard M. Bueschel, 3 pages (date unknown).

Bally Bingo Advertisement for excerpt from “Lemons, Cherries and Bell Fruit Gum,” Richard M. Bueschel, 2 pages (date unknown).

Las Vegas Slot Machine Advertisement for excerpt from “Lemons, Cherries and Bell Fruit Gum,” Richard M. Bueschel, 2 pages (date unknown).

Website Publication for “Phantom Haus,” Williams Electronics Games, Inc., 2 pages (date unknown).

Website Publication for “Arabian Riches,” Silicon Gaming Inc., 2 pages (Jul. 17, 1998).

Website Publication for “Buccaneer Gold,” Silicon Gaming Inc., 2 pages (Jul. 17, 1998).

Website Publication for “Fort Knox,” Silicon Gaming Inc., 2 pages (Jul. 17, 1998).

Website Publication for “Lady of Fortune,” Silicon Gaming Inc., 2 pages (Jul. 17, 1998).

Website Publication for “Riddle of the Sphinx,” Silicon Gaming Inc., 2 pages (Jul. 17, 1998).

Product Sheet for “Kaleidoscope,” Williams Electronics Games, Inc., 3 pages (date unknown).

Product Sheet for “Double Wild & Loose,” Williams Electronics Games, Inc., 4 pages (date unknown).

Product Sheet for “Wild Cherry (120A),” International Game Technology, 2 pages (Nov. 7, 1994).

Product Sheet for “Double Wild Cherry (195A),” International Game Technology, 3 pages (Nov. 7, 1994).

(56) References Cited

OTHER PUBLICATIONS

Chapters 10, 11 & 12, excerpts from "Lemons, Cherries and Bell-Fruit-Gum," Richard M. Bueschel, 84 pages (1995).
Advertisement for "Club Vegas," Barcrest, 1 page (date unknown).
Advertisement for "Viva Club Vegas!," Barcrest, 1 page (date unknown).
Advertisement for "Monopoly: Maygay There for the Taking," 2 pages (date unknown).
Advertisement for "The Big Breakfast," Channel Four Television Corporation, 2 pages (1993).
Advertisement for "Midas Touch," 2 pages (date unknown).
Advertisement for "Acropolis," Automatic (Fruit) Designs, Ltd., 2 pages (date unknown).
Advertisement for "Adders & Ladders," Barcrest, 2 pages (date unknown).
Advertisement for "The Wild West," Bell-Fruit Manufacturing, 2 pages (date unknown).
Advertisement for "Premier Club Manager," Bell-Fruit Manufacturing, 2 pages (date unknown).
Advertisement for "Fortune Wheel," Project Customer Services, 2 pages (date unknown).
Advertisement for "Road Hog," Barcrest, 2 pages (date unknown).
Advertisement for "Viva! Six! Las Vegas," Barcrest, 2 pages (date unknown).
Advertisement for "Golden Circle," Delta Automaten, 1 page (date unknown).
Advertisement for "Club Double," M-D-M Coin Sales Ltd., 2 pages (date unknown).
Advertisement for "Treasure Island," American Alpha, Inc., 1 page (date unknown).
Advertisement for "Bonus Card," Andries Robert Automatic s.p.r.l., 1 page (date unknown).
Advertisement for "Super Square," Maygay Machines Ltd., 2 pages (date unknown).
Advertisement for "Lucky Bank," 1 page (date unknown).
Advertisement for "Happy Clown," Andries Robert Automatic s.p.r.l., 1 page (date unknown).
Advertisement for "Jackpot Stampede," WMS Gaming Inc., 2 pages (date unknown).
Brochure for "Perfect Universal Slot Machines," Universal Co., Ltd., 16 pages (date unknown).
Advertisement for "Club Make a Million," Bell-Fruit Manufacturing Co., Ltd., 2 pages (date unknown).
Advertisement for "Instant Jackpots," Bell-Fruit Manufacturing Co., Ltd., 2 pages (date unknown).
Cover page, "Enter Disposable Gaming," *Euroslot. The International Coin-Operated Machine Journal*, 1 page (Apr. 1994).
Advertisement for Barcrest Limited, 1 page (date unknown).
Cover page for "Covers Your World," *Euroslot. The Currency of the Coin Machine Industry*, 1 page (date unknown).
Article titled "Bangkok on the Brink," *Euroslot. The International Coin-Operated Machine Journal*, 2 pages (Nov. 1993).
Article titled "Scandinavia on the Brink of the EU melting pot," *Euroslot. The International Coin-Operated Machine Journal*, 2 pages (Aug. 1994).
Advertisement for "Only Fools and Horses," Bell-Fruit Manufacturing Co., Ltd., 2 pages (date unknown).
Advertisement for "Main Attraction," Bell-Fruit Manufacturing Co., Ltd., 2 pages (date unknown).
Brochure for "World Players," Barcrest, 6 pages (date unknown).
Brochure for "JPM Presents MONOPOLY Deluxe," JPM International Ltd., 5 pages (date unknown).
Brochure for "The 50th Show," Ate International, 2 pages (Jan. 1994).
Advertisement for "Colossus," AFD, 1 page (date unknown).
Advertisement for "Wheel of Fortune," Project Creating Entertainment, 2 pages (date unknown).
Advertisement for "Lucky Horseshoes," JPM Automatic Machines Ltd., 2 pages (date unknown).
Advertisement for "Lucky Jackpots," JPM Automatic Machines Ltd., 2 pages (date unknown).
Advertisement for "MONOPOLY," JPM Automatic Machines Ltd., 2 pages (date unknown).

* cited by examiner

WAGERING GAME WITH AWARD ENHANCEMENT FEATURE

CROSS REFERENCE TO RELATED APPLICATIONS

This application claims priority to U.S. provisional application Ser. No. 60/572,435, filed on May 19, 2004. The disclosure of the aforementioned provisional application is incorporated by reference in its entirety herein.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine having a game feature that includes a trail having a plurality of spaces that each have an award value associated with them and where the award value is changed by a random event unassociated with the trail.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

SUMMARY OF THE INVENTION

According to one aspect of the present invention, a method of conducting a wagering game is disclosed. The method comprises receiving a wager from a player to play the wagering game and displaying a trail including a plurality of spaces and an award value associated with one or more of the plurality of spaces. The method further comprises changing the award value based on an occurrence of a random event independent from the trail.

According to another aspect of the invention, a method of conducting a wagering game on a gaming machine is disclosed. The method comprises receiving a wager from a player to play a slots game and displaying the slots game including moving a plurality of reels having a plurality of symbols displayed thereon. The method further comprising conducting a secondary game when a predetermined symbol or symbol combination has been achieved during play of the slots game. The conducting includes (i) moving and stopping a plurality of bonus reels adapted to display a plurality of symbols thereon and (ii) displaying a game screen having a plurality of spaces that form a bonus trail. The plurality of symbols includes at least one award-value-increasing symbol. At least one of the plurality of spaces has an award value associated therewith. The method further comprises increasing at least one of the award values in the game screen in response to the at least one award-value-increasing symbol being achieved.

According to yet another aspect of the invention, a gaming machine for conducting a wagering game is disclosed. The gaming machine comprises a value input device, one or more displays, and a controller. The value input device receives a wager from a player to play the wagering game. The one or more displays display a trail including a plurality of spaces and an award value associated with one or more of the plurality of spaces. The controller is operative to change the award value based on an occurrence of a random event independent from the trail.

Additional aspects of the invention will be apparent to those of ordinary skill in the art in view of the detailed description of various embodiments, which is made with reference to the drawings, a brief description of which is provided below.

DETAILED DESCRIPTION

Figure 1:
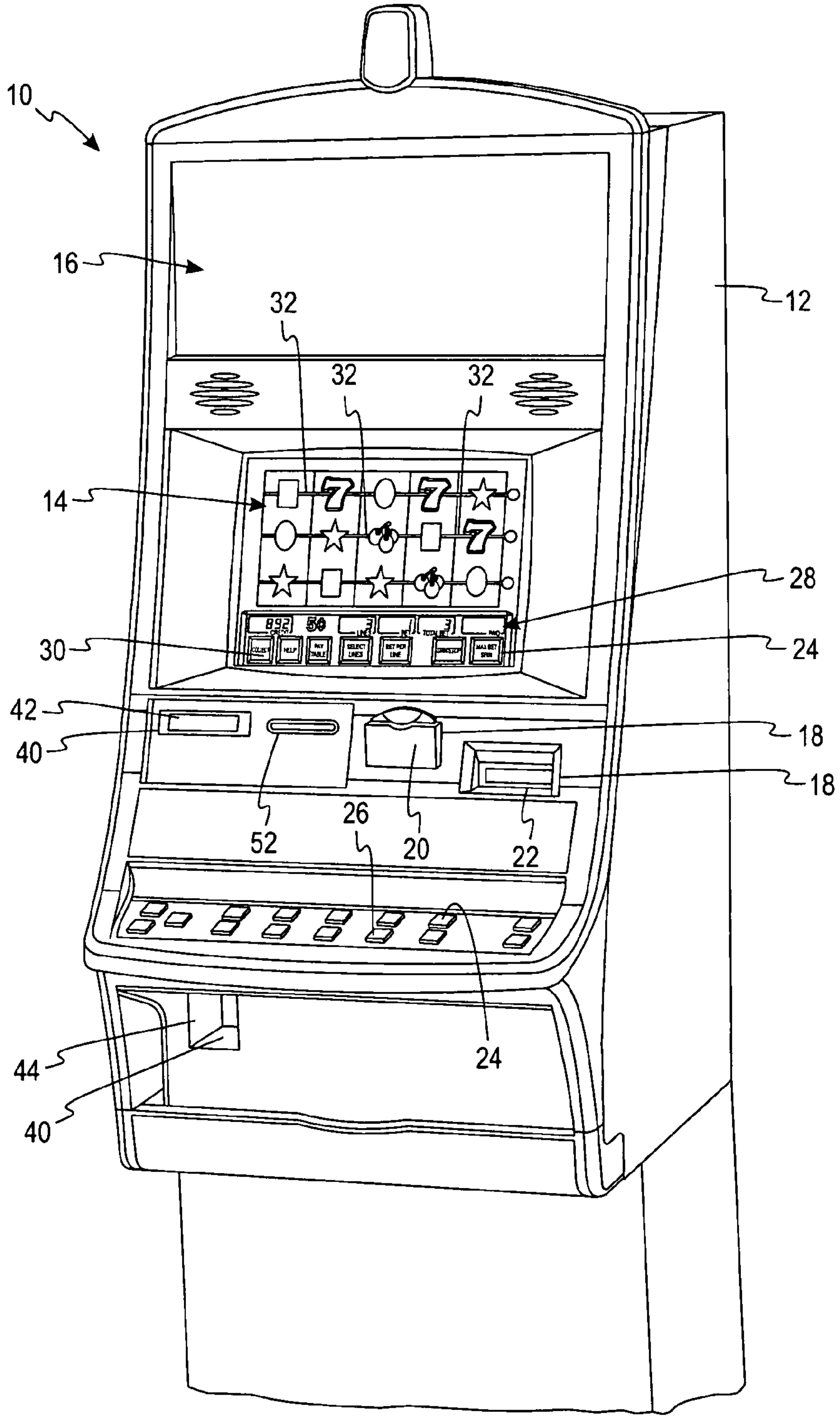
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof to allow players to make game-related selections. Alternatively, the primary display 14 of the gaming machine 10 may include a number of mechanical reels to display the outcome in visual associated to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
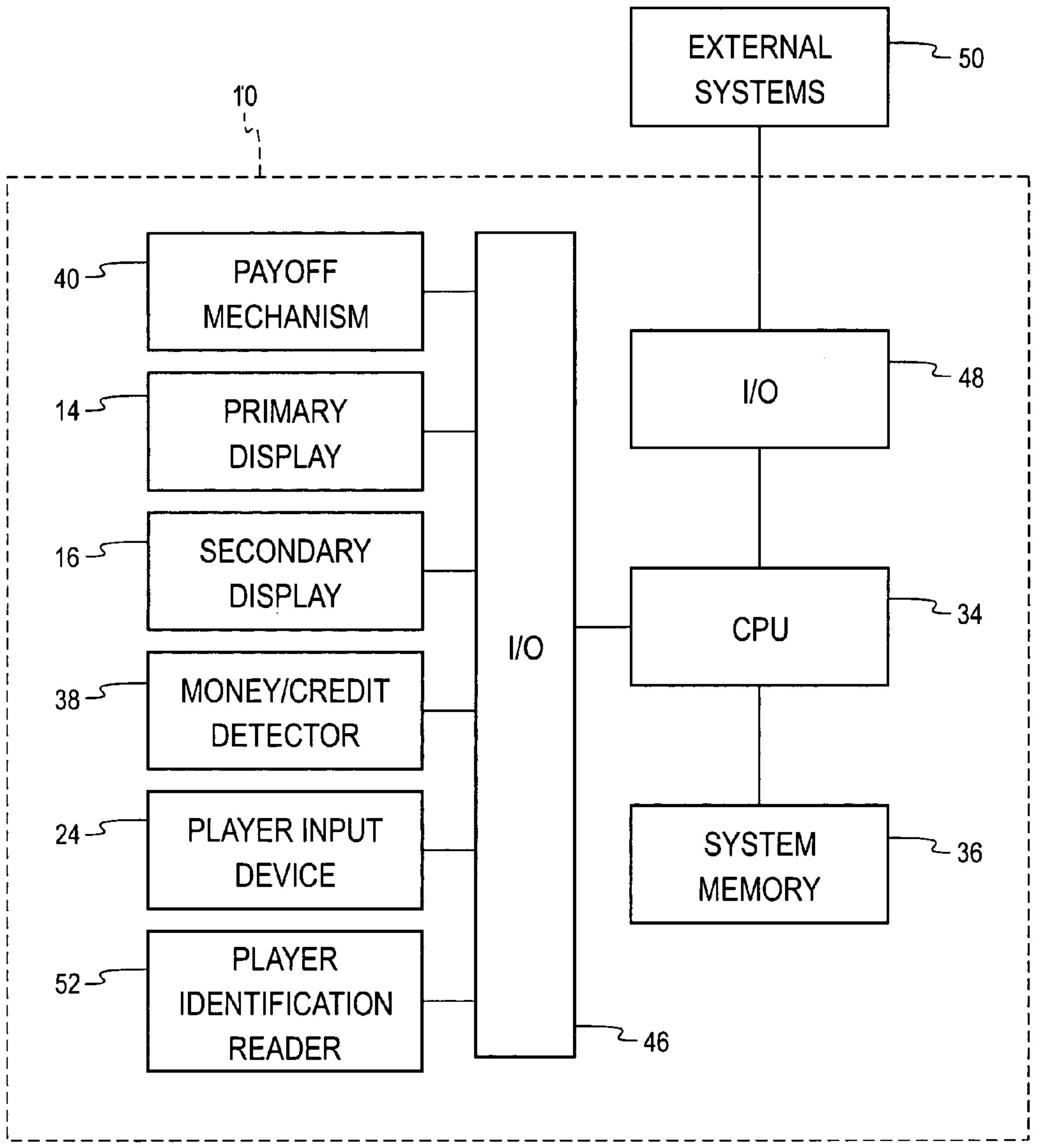
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the I/O circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
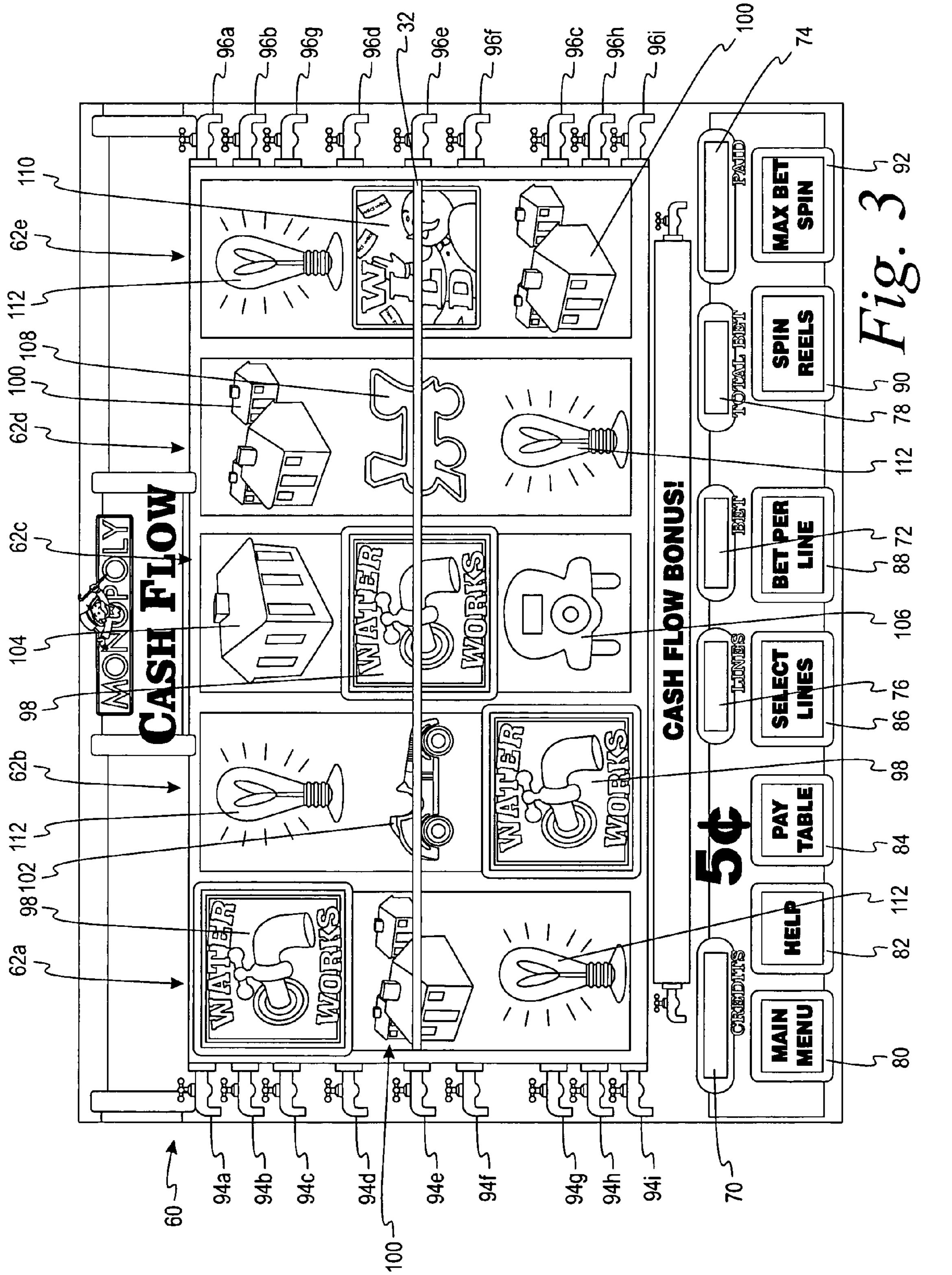
FIG. 3 is an image of a main display that is displayed on the gaming machine of FIG. 1, according to one embodiment of the present invention.

Turning now to FIG. 3, an image of a main game screen 60 is adapted to be displayed on the primary display 14 (FIG. 1). A player begins play of the basic wagering game by inserting a wager input into the value input device 18 of the gaming machine 10. A player can select play by either using the touch screen 28 or push buttons 26. The CPU 34, or the external systems 50 in alternative embodiments, operates to execute a wagering game program causing the primary display 14 to display the main game screen 60 that includes a plurality of reels 62*a-e*. Each of the reels 62*a-e* is adapted to display a plurality of symbols thereon. The main game screen 60 also displays game-session meters and various buttons selectable by a player.

As illustrated in FIG. 3, the game-session meters include: a "credits" meter 70 for displaying a number of credits available for play on the machine; a "bet" meter 72 for displaying a number of credits wagered (e.g., from 1 to 5 credits); a "paid" meter 74 for displaying an amount to be awarded based on the results of the particular rounds outcome; a "lines" meter 76 for displaying the number of lines being played; and a "total bet" meter for displaying the total number of credits being wagered (i.e., the wager times the number of lines being played). The player-selectable buttons include a "main menu" button 80 for allowing a player to access a main menu; a "help" button 82 for viewing instructions on how to play the wagering game; a "pay table" button 84 for viewing a pay table associated with the basic wagering game; a "select lines" button 86 for changing the number of paylines (displayed in the lines meter 76) a player wishes to play; a "bet per line" button 88 for changing the amount of the wager which is displayed in the line-bet meter 76; a "spin reels" button 90 for moving the reels 62*a-e*; and a "max bet spin" button 92 for wagering a maximum number of credits and moving the reels 62*a-e* of the basic wagering game. While the gaming machine 10 allows for these types of player inputs, the present invention does not require them and can be used on gaming machines having more, less, or different player inputs.

In FIG. 3, the five depicted reels 62*a-e* have a plurality of symbols displayed thereon and at least one active payline extending from one of the payline indicators 94*a-i* on the left side of the main game screen 60 to a corresponding one of the payline indicators 96*a-i* on the right side of the main game screen 60. The plurality of symbols displayed on the plurality of reels 62*a-e* are used to indicate a plurality of possible outcomes along each of the activated paylines. The depicted symbols all correspond to a MONOPOLY® theme and include: "WATER WORKS" symbols 98; "HOUSE" symbols 100; "ELECTRIC COMPANY" symbols 112; "CAR" symbols 102; "HOTEL" symbols 104; "FREE PARKING" symbols 106; "RAILROAD" symbols 108; and "WILD CARD" symbols 110. Other MONOPOLY®-themed symbols may also be depicted. In other embodiments of the present invention, the gaming machine 10 may portray other themes with corresponding like-themed reel symbols. Further, standard gaming symbols such as "1-BAR" symbols, "2-BAR" symbols, "3-BAR" symbols, "CHERRY" symbols, "SEVEN" symbols, and "BELL" symbols may be depicted on the reels 62*a-e* in other embodiments.

A winning combination occurs when the symbols along an active payline 32 (FIG. 1) across the reels 62*a-e* correspond to one of the winning symbol combinations listed in a pay table stored in the memory 36 of the gaming machine 10. The pay table may also be displayed on the secondary display 16, the primary display 14, or both and be either displayed constantly, intermittently, or upon request by a player (e.g., by selecting the pay-table button 84). Such winning combinations are displayed relative to one or more paylines 32. The active paylines 32 extend between activated pairs of payline indicators 94*a-i*, 96*a-i* such as, for example, the payline 32 (FIG. 1) that extends between payline indicators 94*e* and 96*e*. Winning combinations listed in the pay table can include three like-symbols appearing on a payline yielding a first payout, four like-symbols appearing on a payline yielding a second, larger payout, and five like-symbols appearing on a payline yielding a third, even larger payout. In addition, a winning spin could be the result of a predetermined symbol or group of symbols appearing either on or off of a payline.

The reels 62*a-e* may be either traditional mechanical reels or they may be computer-generated images of reels as shown in FIG. 1. The payline indicators 94*a-i*, 96*a-i* indicate a randomly selected outcome for each payline 32, which is the combination of symbols on the reels 62*a-e* along the particular payline 32. A player may play multiple paylines 32 by selecting the select-lines button 86 until the desired number of paylines 32 (up to nine in the illustrated embodiment) are displayed. While an embodiment with nine paylines is shown, a gaming machine 10 with a single payline, or multiple paylines will also work with the present invention. Additionally, though an embodiment with five reels is shown, a gaming machine 10 with any plurality of reels may also be used in accordance with the present invention.

As discussed above, a player wagers one or more credits on the gaming machine 10 to begin the wagering game. Once a player wagers one or more credits, the gaming machine 10 displays the wagering game for the player. FIG. 3 illustrates one possible random outcome for the wagering game of the present invention. As shown in FIG. 3, no set of three or more symbols is located along an active payline 32. However, in this embodiment, the collection of three or more WATERWORKS symbols 98 on the reels 62*a-e* in any arrangement (i.e., a "scatter" arrangement) initiates a secondary game, such as a "Cash-Flow" bonus game.

Figure 4:
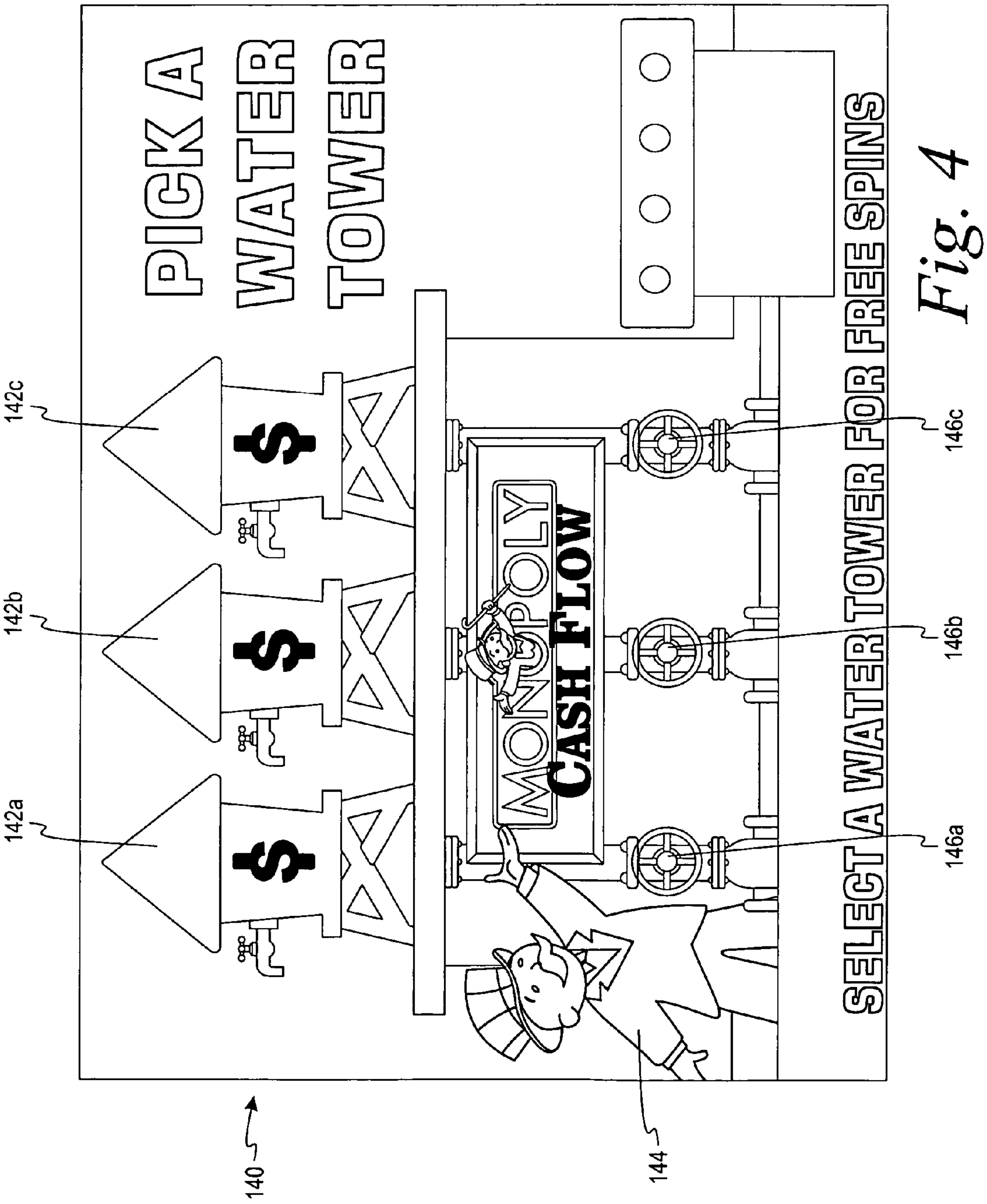
FIG. 4 is an image of a game-play selection screen, according to one embodiment.

Referring now to FIG. 4, an image of a selection screen 140 on the primary display 14 (FIG. 1) is illustrated for the "Cash-Flow" bonus game. The selection screen 140 includes a plurality of player-selectable objects, such as water towers 142*a, b,c* in the illustrated embodiment. The water towers 142*a,b,c* are adapted to provide one or more bonus spins to the player when one of the water towers 142*a,b,c*, is selected. The number of bonus spins may be randomly selected from numbers within a predetermined range of values (e.g., between one and twenty spins). Once a water tower 142*a,b,c* has been selected, Mr. Monopoly 144 actuates the respective valve 146*a,b,c* and the number of bonus spins earned by the player is displayed.

Figure 5:
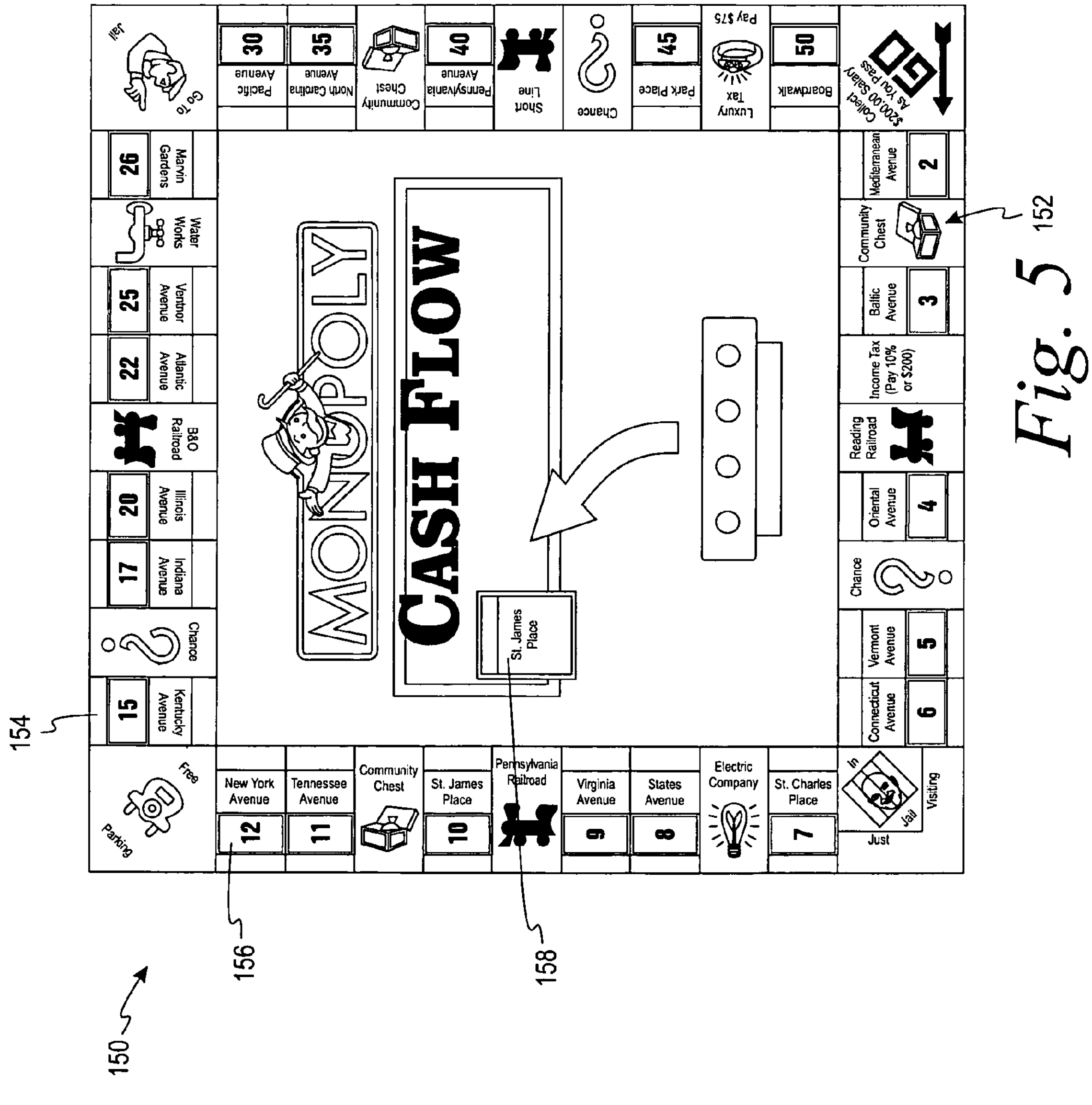
FIG. 5 is an image of a bonus trail in the form of a game board, that is displayed on a secondary display of the gaming machine of FIG. 1.

The selection screen 140 is also utilized to allow the player to select one or more markers that represents a space or spaces along the trail of FIG. 5. The player is again prompted to select one or more of the water towers 142*a,b,c* and Mr. Monopoly 144 actuates the associated valve(s) 146*a,b,c* to display the marker(s) to the player. The awarded marker is then transferred to a secondary bonus-game screen 150 and continues to be displayed to the player, as illustrated in FIG. 5.

The secondary bonus-game screen 150 is displayed on the secondary display 16 (FIG. 1) of the gaming machine 10 and includes a bonus trail 152 having a plurality of spaces 154 therealong. The secondary bonus-game screen 150 is a non-playable game screen and as such, the secondary bonus-game screen 150 displays information to the player but the player does not directly interact with the secondary bonus-game screen 150. In the illustrated embodiment, the bonus trail 152 is a standard MONOPOLY® board and the plurality of spaces 154 are the individual properties that form the bonus trail 152. One or more of the plurality of spaces 154 has an award value associated with the space. The associated award value is displayed to the player in the "award value" meter 156 located within an individual space 154.

As discussed above, a marker 158 in the form of a property deed is transferred from the selection screen 140 to the secondary bonus-game screen 150 and is displayed to the player. In this case, the marker 158 represents the "St. James Place" property and indicates that the player has earned the award value associated with the property. Consequently, the player has earned the associated award value of 10 credits through this stage of the "Cash-Flow" bonus game.

Figure 6A:
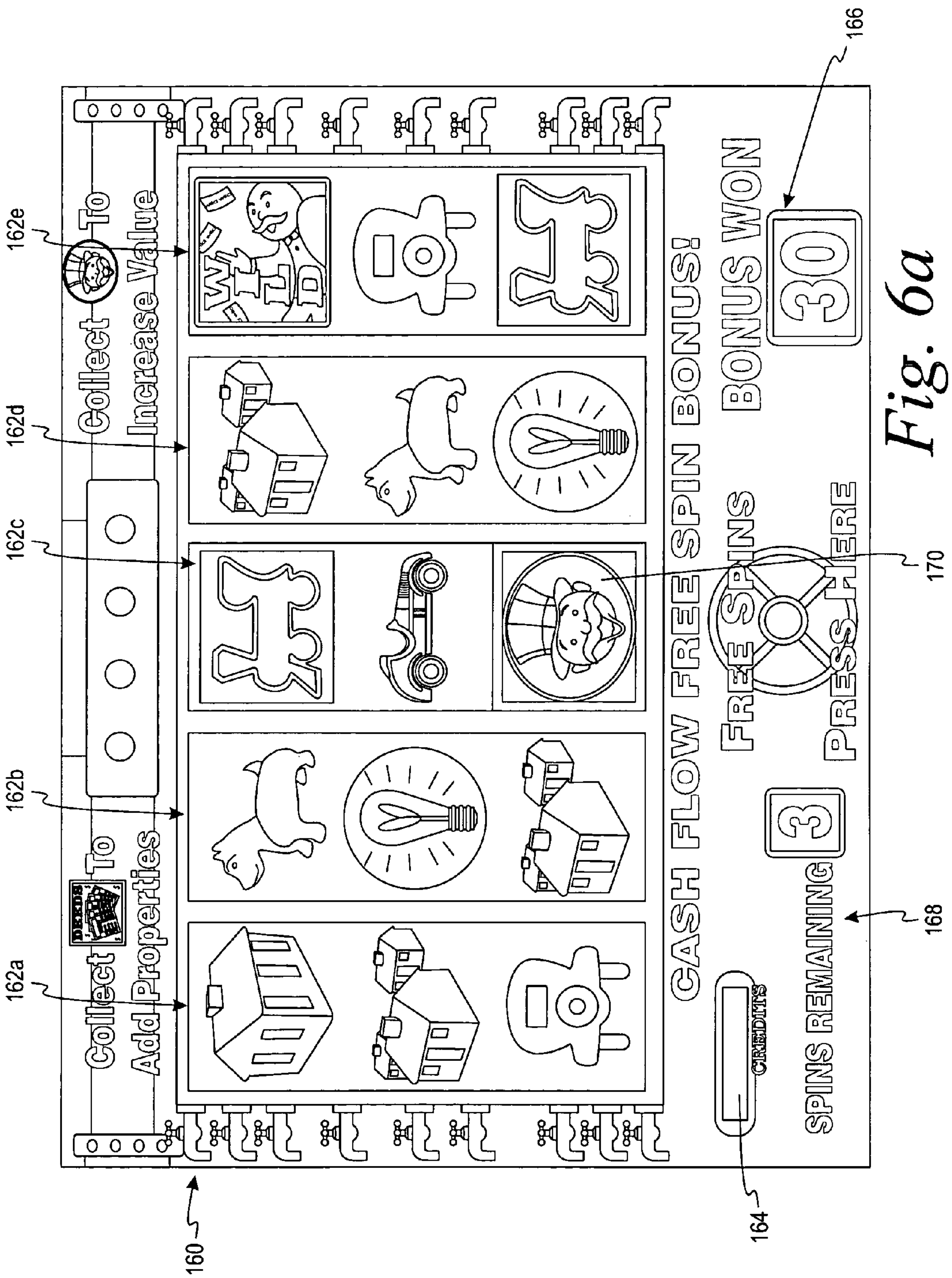
FIG. 6*a* is an image of a "Cash-Flow" bonus screen including a plurality of bonus reels where a manhole symbol is displayed on one of the bonus reels.

After the player has earned one or more free spins and been awarded one or more markers 158, a primary bonus-game screen 160, illustrated in FIG. 6*a*, is displayed on the primary display 14. The primary bonus-game screen 160 is a playable game screen with which the player directly interacts. The primary bonus-game screen 160 includes a plurality of bonus reels 162*a-e* that have a plurality of symbols displayed thereon. The primary bonus-game screen 160 additionally includes a "credits" meter 164 for displaying the number of credits the player currently has, a "bonus won" meter 166 for displaying a bonus award for a particular bonus spin, and a "spins remaining" meter 168 for displaying the number of bonus spins the player has remaining.

The bonus reels 162*a-e* may be identical to the reels 62*a-e* of the main game screen 60 (FIG. 3) or may have additional, different, similar, or fewer symbols that the reels 62*a-e*. At least one of the plurality of bonus reels 162*a-e* includes an award-value-increasing symbol 170, such as the "MANHOLE" symbol illustrated in FIG. 6*a*. When the award-value-increasing symbol 170 is earned by the player, the award values associated with the plurality of spaces 154 forming the bonus trail 152 are increased as will be discussed below with respect to FIGS. 6*b*-7*b*.

Figure 6B:
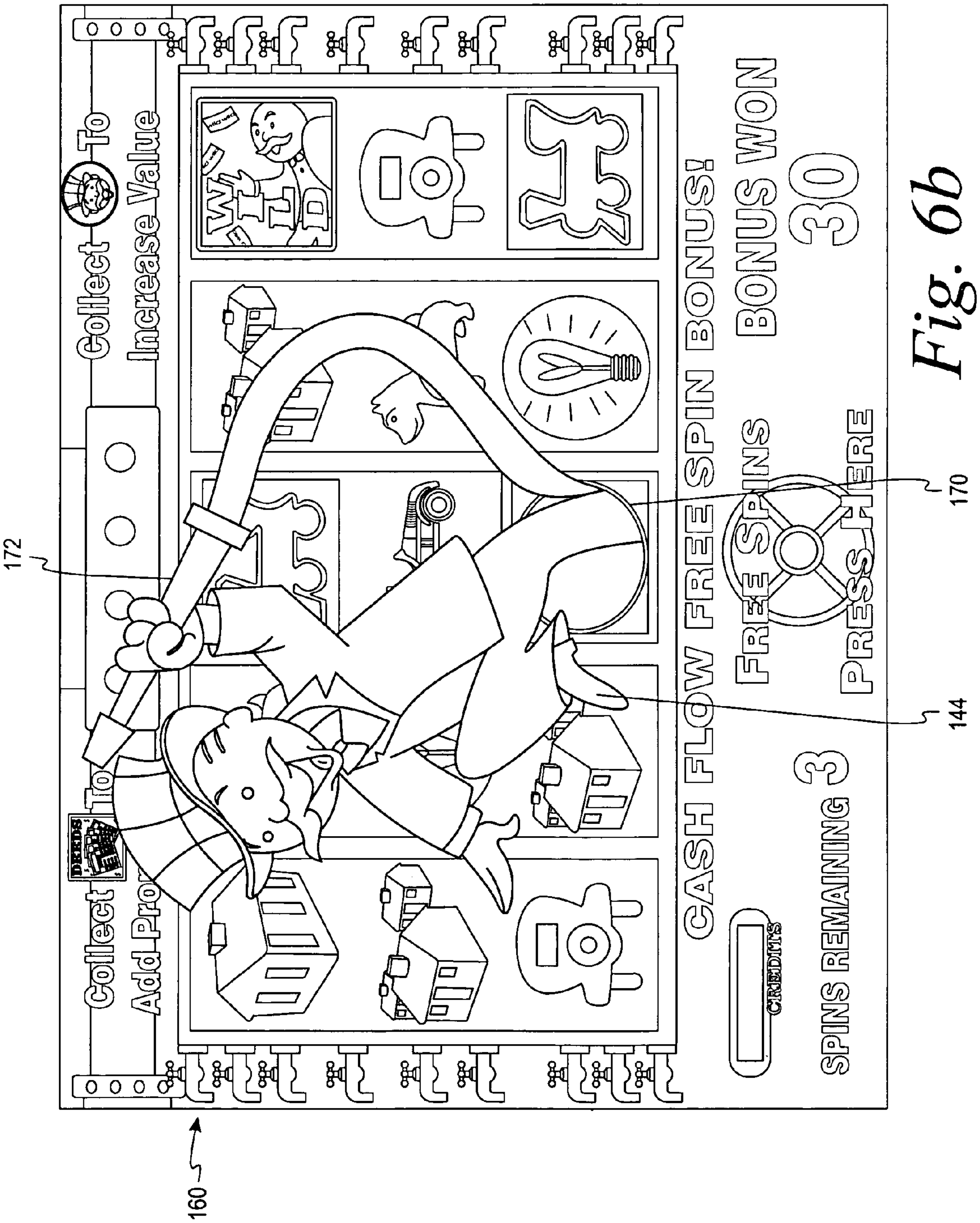
FIG. 6*b* is an image of "Mr. Monopoly" exiting the manhole symbol of FIG. 6*a*.

In FIG. 6*b*, Mr. Monopoly 144 is illustrated exiting from the award-value-increasing symbol 170 (e.g., jumping from the opened manhole symbol). Mr. Monopoly 144 is shown exiting the award-value-increasing symbol 170 with a fire hose 172 that is used to display and animate the increasing of the award values to the player, as illustrated by the award-value-increase event shown in FIGS. 7*a-b*.

Figure 7A:
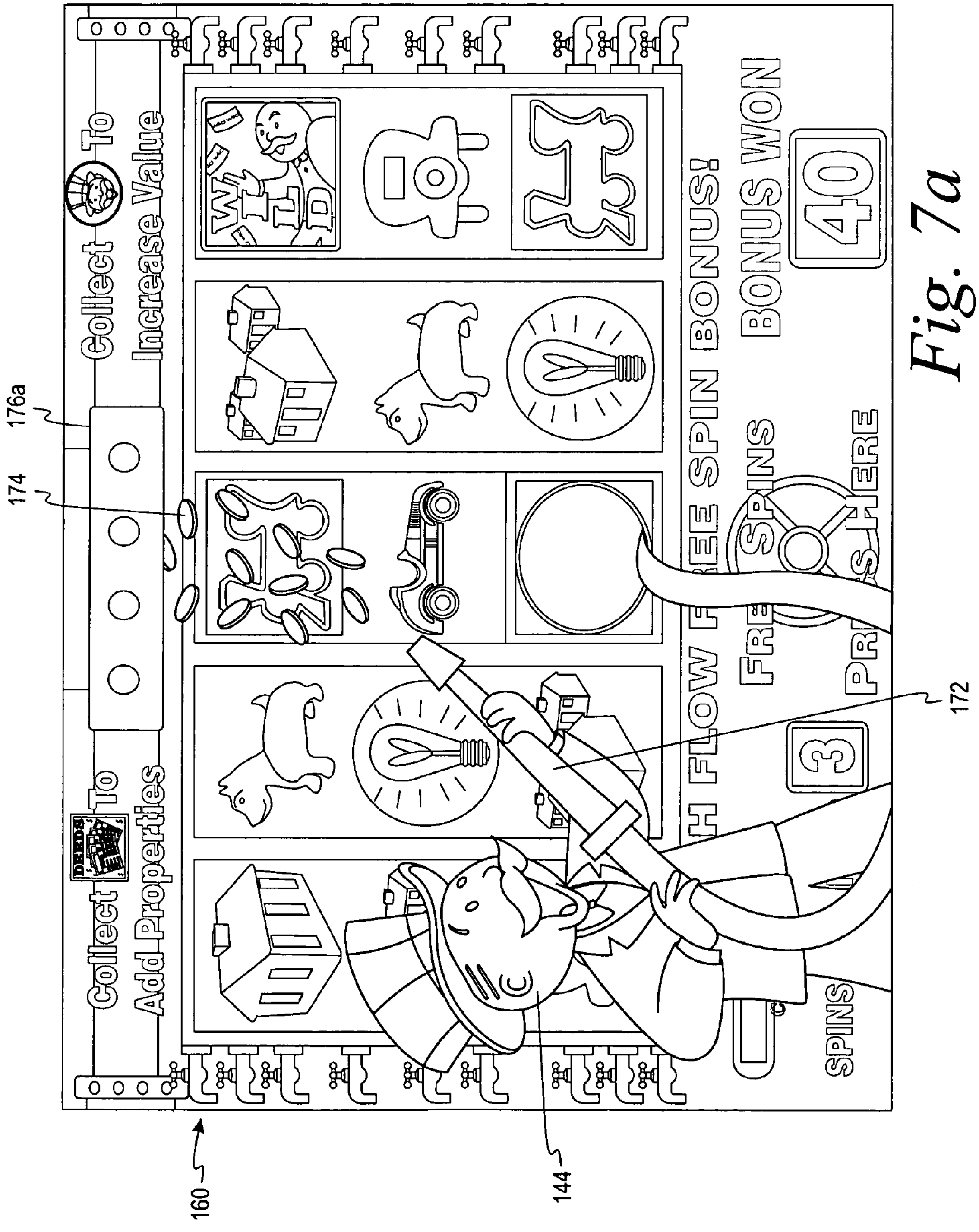
FIG. 7*a* is an image of a bonus game screen displayed on a main display of the gaming machine of FIG. 1 during an award-value-increase event.
Figure 7B:
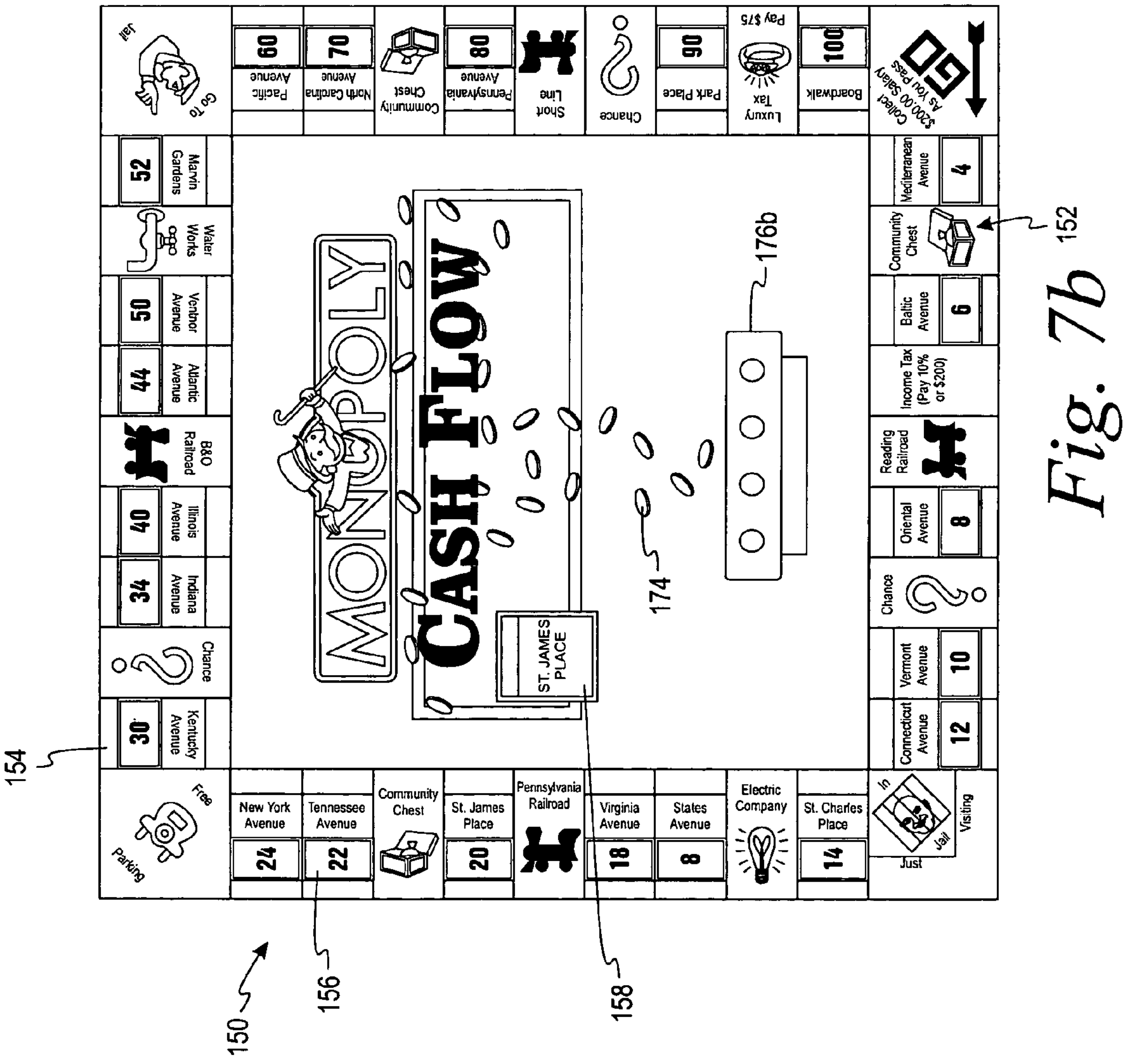
FIG. 7*b* is an image of a bonus game screen displayed on a secondary display of the gaming machine of FIG. 1 during an award-value-increase event.

In FIG. 7*a*, Mr. Monopoly 144 uses the fire hose 172 to shoot a plurality of coins 174 into a first end of a pipe 176*a* on the primary bonus-game screen 160. The coins 174 are then displayed on the secondary bonus-game screen 150 as the coins 174 exit a second end of a pipe 176*b*, as shown in FIG. 7*b*. According to one embodiment, the award values are then doubled for both the previously awarded markers 158 as well as any additional markers 158 earned during the course of the bonus game. It should be noted that although the illustrated embodiment is shown having an animated award-value increase, in other embodiments of the present invention, the award values are increased substantially immediately upon earning an award-value-increasing symbol. In yet other embodiments, different animation schemes that do not require Mr. Monopoly 144, a fire hose 172, coins 174, and/or pipes 176*a,b* are used to increase the award values.

Figure 8:
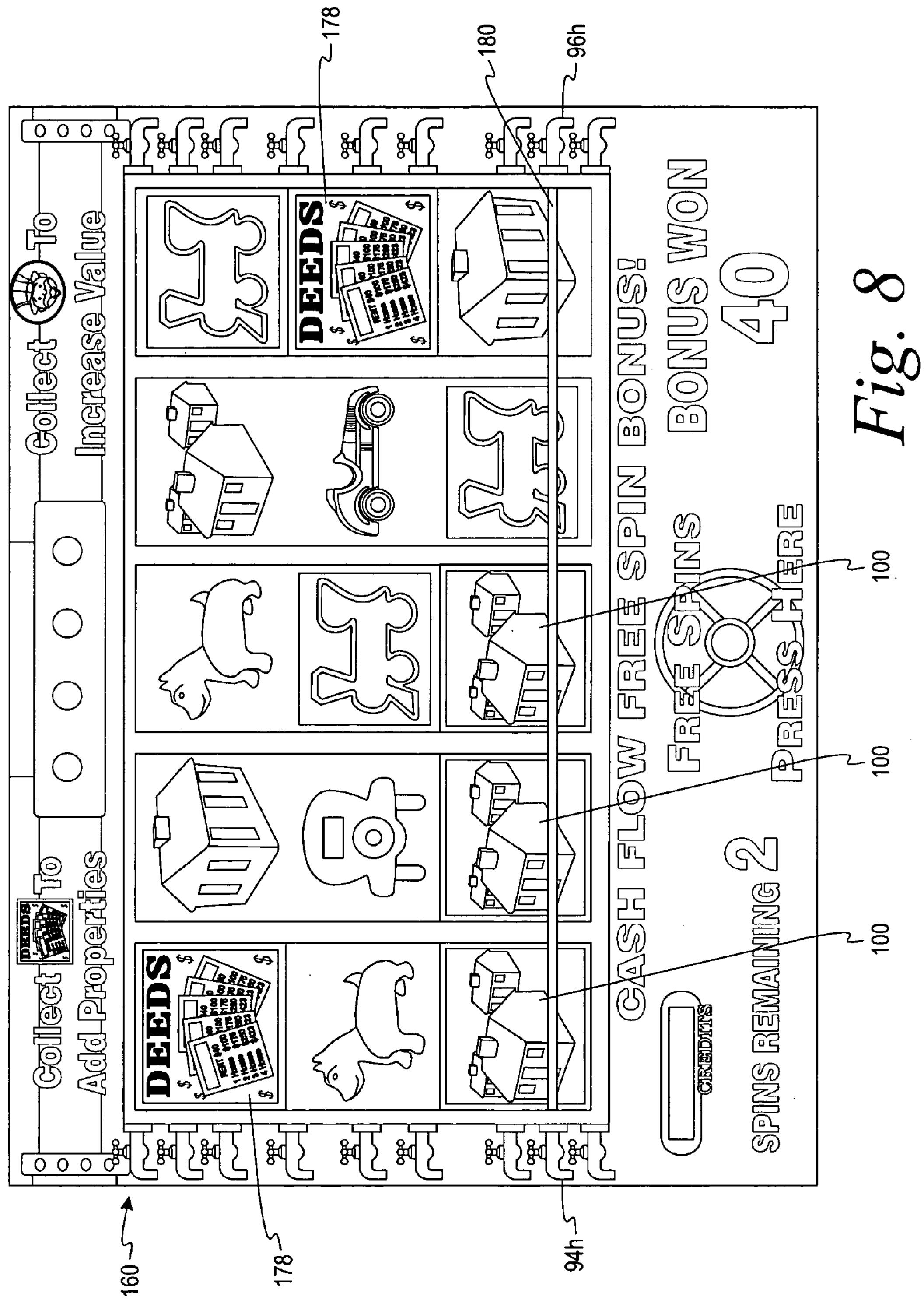
FIG. 8 is an image of the "Cash-Flow" bonus screen of FIG. 6*a* where the player has earned additional spaces on the bonus trail on the secondary display.

Once the award-value-increase event ends, the player is returned to the primary bonus-game screen 160 to continue utilizing their remaining bonus spins. Turning now to FIG. 8, the primary bonus-game screen 160 is again illustrated with yet another random outcome displayed after the player has utilized another of their bonus spins. With this bonus spin, the player has earned an award for the three house symbols 100 located along a payline 180 that extends between payline indicators 94*h* and 96*h*. In addition to this award, the player has collected two deed symbols 178 and as such, is awarded two additional markers 158 that are displayed in the secondary bonus-game screen 150 along with the originally awarded marker 158.

Figure 9:
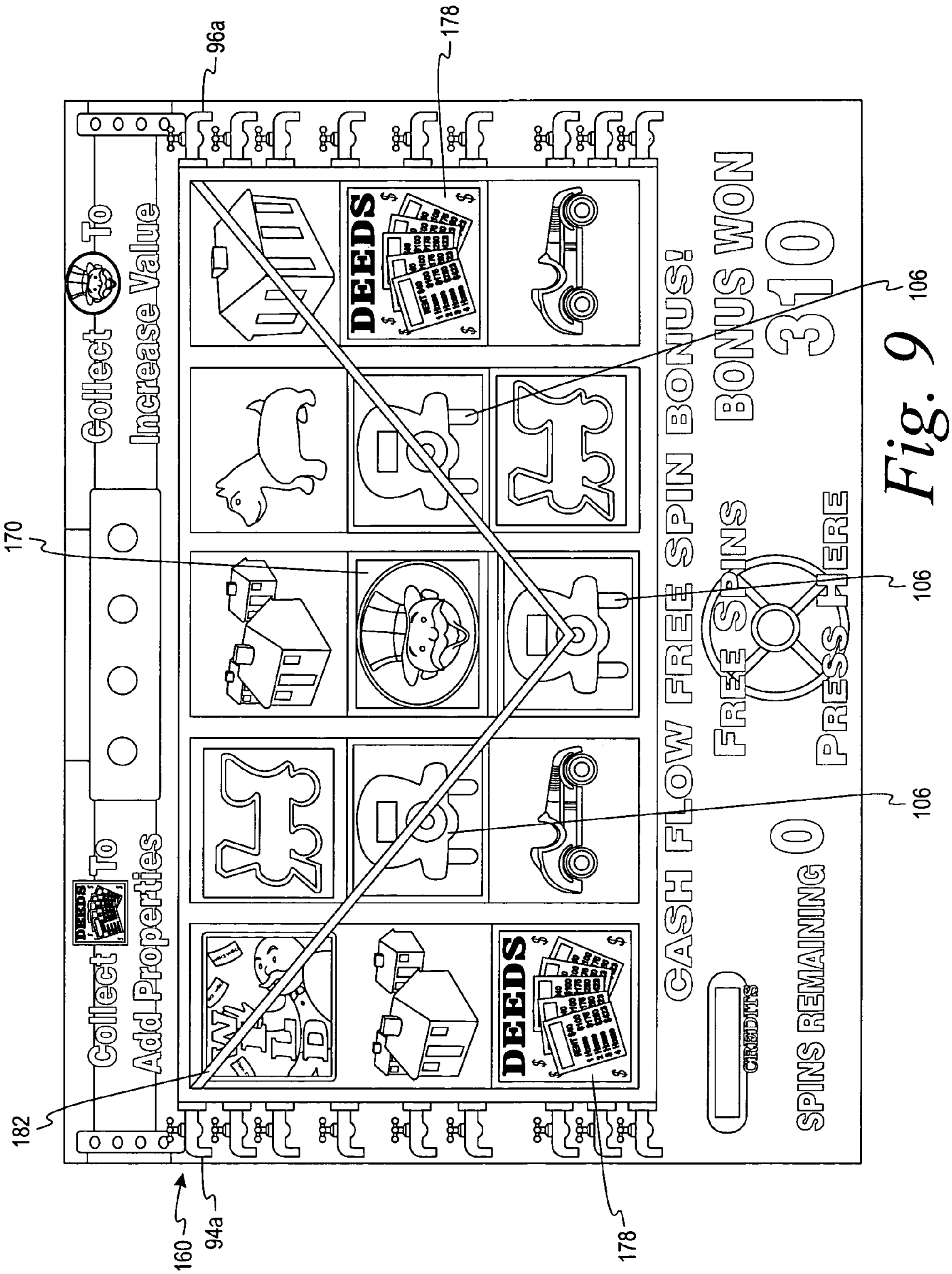
FIG. 9 is an image of the "Cash-Flow" bonus screen of FIG. 6*a* where the player has earned additional spaces on the bonus trail on the secondary display and a manhole symbol is displayed on one of the reels.
Figure 10:
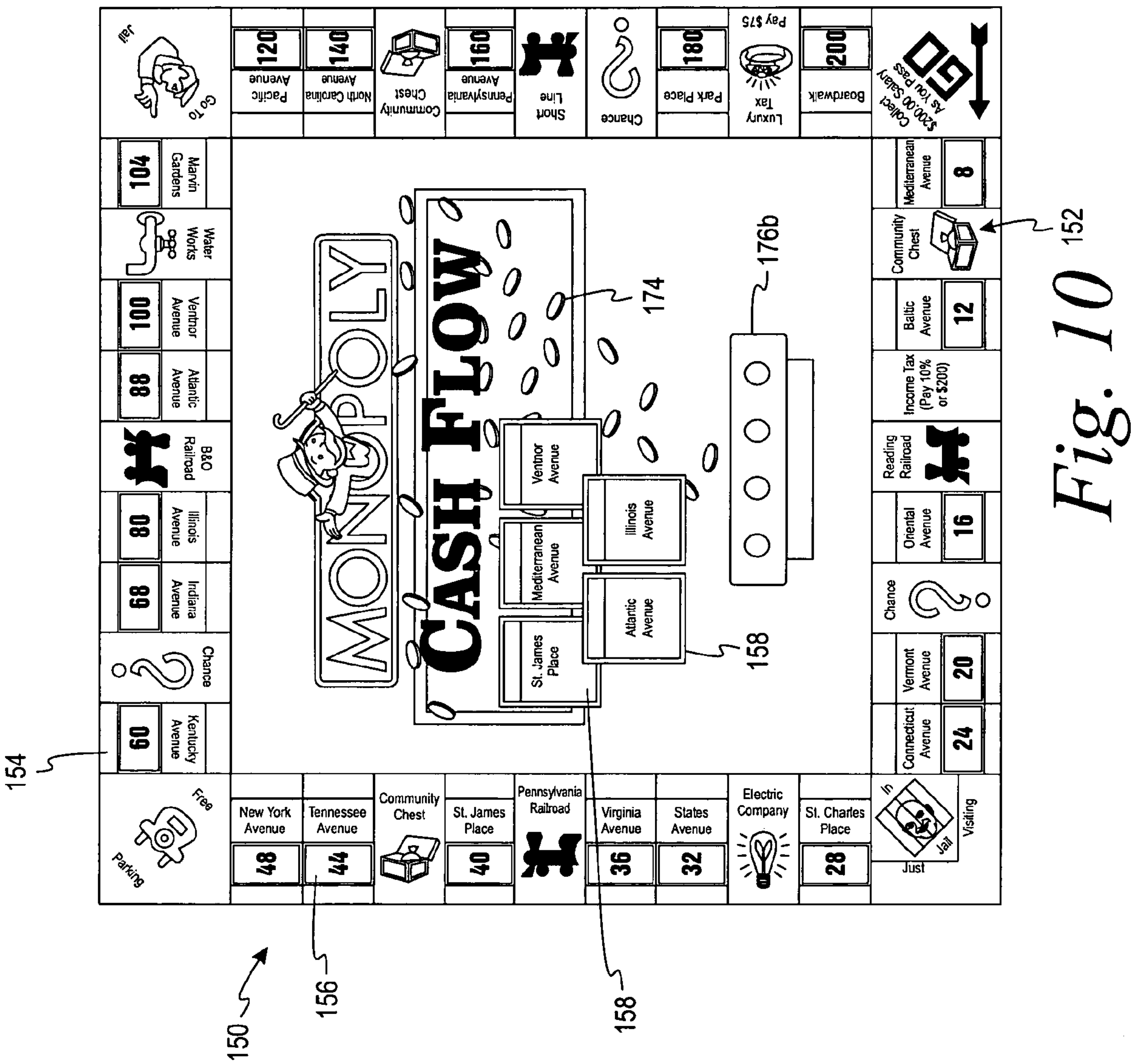
FIG. 10 is an image of a bonus game screen displayed on a secondary display of the gaming machine of FIG. 1 during a second award-value-increase event.

The player continues to utilize their remaining bonus spins to try and earn additional awards and markers 158. As illustrated in FIG. 9, on the player's final bonus spin the player has earned an award for collecting three free-parking symbols 106 along a payline 182 extending between payline indicators 94*a* and 96*a*. The player has also earned two deed symbols 178 and is awarded two additional markers 158 that are displayed in the secondary bonus-game screen 150. The player has additionally earned an award-value-increasing symbol 170 that again increases the award values of the plurality of spaces 154 forming the bonus trail 152, as illustrated in FIG. 10. In FIG. 10, the five markers 158 are displayed within the bonus trail 152.

Once the player's bonus spins have been utilized, the associated award values for each of the collected markers 152 is provided to the player. As shown in FIG. 10, the award value for each of the plurality of spaces 154 has increased four-fold from the start of the bonus game. In the embodiment illustrated, each of the award-value-increase events doubled the award value for each of the plurality of spaces 154 when the award-value-increasing symbol 170 was earned. In this embodiment, the first award-value-increase event doubled the initial award value for each of the plurality of spaces 154 while the second award-value-increase event doubled the already doubled award value, thus quadrupling the initial award value for each of the plurality of spaces 154.

According to another embodiment of the present invention, one or more dice symbols are included on the bonus reels 162. When the player collects a dice symbol, the dice (or single die) are rolled to advance a space identifier (e.g., a token) along the bonus trail 152. The player earns the marker 158 for any of the plurality of spaces 154 that the space identifier comes to rest on. In addition, the player may earn a special bonus for making a complete loop around the bonus trail 152.

In other embodiments of the present invention, the award values are increased by a predetermined integer multiplier that is between 1 and 10. In still other embodiments, the award values are increased by a randomly selected integer multiplier. In yet other embodiments, a number of the plurality of spaces 154 along the trail 152 are combined into various-sized groups, for example, by color coding the plurality of spaces 154. In these embodiments, the award values for the plurality of spaces 154 are increased or a special award is provided when a player collects all of the properties in a particular group.

To summarize one of the above detailed embodiments, a predetermined combination of symbols triggers a "Cash-Flow" bonus game. When the "Cash-Flow" bonus game is triggered, the player selects one of the trigger symbols (e.g., water towers) for a number of free spins, and to determine at least a first property that is awarded. Upon selecting the trigger symbol, the screen transitions to the bonus reels where players—in the free spins allotted—will be trying to collect "Deed" symbols and "Hatch" symbols (e.g., manhole symbols), in addition to collecting line pays.

For every deed symbol that is collected, a popup may appear with two unmarked MONOPOLY® cards; one card is from the first two sides of the board, and the second card is from the remaining two sides of the board. Players are prompted to select one (or two) of the cards to be awarded an additional property. For every "Hatch" symbol collected, the values on all of the board properties will increase in value. Players completing color groups receive a 2× MONOPOLY® pay for that color group. Players will also be awarded for any other line pays that occur during the free spins. At the end of the free spins, the values of the properties collected are awarded to the player, in addition to all the line pays that were collected during the bonus.

Each of these embodiments and obvious variations thereof is contemplated as falling within the spirit and scope of the claimed invention, which is set forth in the following claims.

What is claimed is:

1. A method of conducting a wagering game on a gaming machine, comprising:

receiving, via an input device, a wager from a player to play the wagering game;

using at least one processor to conduct a secondary game after achieving a predetermined outcome in the wagering game, the secondary game including a primary bonus game and a secondary bonus game displayed on at least one display device, the secondary bonus game including a trail, the trail including a plurality of spaces and an award value associated with one or more of the plurality of spaces; and changing the award value based on an occurrence of a random event during the primary bonus game, the random event being independent from the trail.

2. A computer readable storage medium encoded with instructions for directing a gaming device to perform the method of claim 1.

3. The method of claim 1, wherein the primary bonus game includes a plurality of reels having a plurality of symbols displayed thereon.

4. The method of claim 1, wherein the conducting a secondary game includes moving a space identifier along the trail.

5. The method of claim 1, wherein the occurrence of the random event initiates an award-value-increase event.

6. A method of conducting a wagering game on a gaming machine, comprising:

receiving, via an input device, a wager from a player to play a slots game;

displaying, on at least one display device, the slots game including moving a plurality of reels having a plurality of symbols displayed thereon;

using at least one processor to conduct a secondary game when a predetermined symbol or symbol combination has been achieved during play of the slots game, the conducting including (i) moving and stopping a plurality of bonus reels adapted to display a plurality of symbols thereon, the plurality of symbols including at least one award-value-increasing symbol, and (ii) displaying, on the at least one display device, a plurality of spaces that form a bonus trail, at least one of the plurality of spaces having an award value associated therewith; and using the at least one processor to increase at least one of the award values in response to the at least one award-value-increasing symbol being achieved.

7. The method of claim 6, wherein the bonus trail is board game.

8. The method of claim 6, wherein the plurality of spaces forming the bonus trail are combined to form a plurality of groups.

9. The method of claim 8 further comprising providing an award when one of the plurality of groups is collected.

10. The method of claim 6, wherein a space identifier is moved along the bonus trail based on the outcome of the bonus reels.

11. The method of claim 6, wherein a marker is earned for one of the plurality of spaces based on the outcome of the symbol array on the bonus reels, the marker indicating that the player has earned the award value associated with the one of the plurality of spaces that the marker represents.

12. The method of claim 6, wherein the moving and stopping of the plurality of reels is simulated on a video display.

13. A gaming machine for conducting a wagering game, comprising:

a value input device for receiving a wager from a player to play the wagering game;

one or more display devices for displaying a basic wagering game and a secondary game, the secondary game including a primary bonus game and a secondary bonus game, the secondary bonus game including a trail including a plurality of spaces and an award value associated with one or more of the plurality of spaces; and a controller operative to change the award value based on an occurrence of a random event during the primary bonus game, the random event being independent from the trail.

14. The gaming machine of claim 13, wherein the primary bonus game includes a plurality of bonus reels, the plurality of bonus reels having a plurality of symbols displayed thereon, and wherein the controller is further operative to (i) conduct the basic wagering game, (ii) initiate the secondary game in response to a predetermined outcome being achieved during the basic wagering game, and (iii) change the award value in response to a predetermined outcome of symbols being displayed on the plurality of bonus reels in the primary bonus game.

15. The gaming machine of claim 14, wherein the award values are increased in the secondary bonus game in response to certain symbols being displayed during play of the primary bonus game, the certain symbols being the predetermined outcome.

16. The gaming machine of claim 14, wherein the plurality of bonus reels and the trail are simultaneously displayed.

17. The gaming machine of claim 13, wherein a space identifier is moved along the trail based on the outcome of the plurality of bonus reels.

* * * * *